United States Patent [19]
Yoshioka et al.

[11] Patent Number: 5,930,833
[45] Date of Patent: Jul. 27, 1999

[54] LOGICAL CACHE MEMORY STORING LOGICAL AND PHYSICAL ADDRESS INFORMATION FOR RESOLVING SYNONYM PROBLEMS

[75] Inventors: Shinichi Yoshioka, Kodaira, Japan; Shumpei Kawasaki, Palo Alto, Calif.

[73] Assignee: Hitachi, Ltd., Tokyo, Japan

[21] Appl. No.: 08/924,551

[22] Filed: Aug. 21, 1997

Related U.S. Application Data

[63] Continuation of application No. 08/420,539, Apr. 12, 1995, abandoned.

[30] Foreign Application Priority Data

Apr. 19, 1994 [JP] Japan .................................. 6-104723

[51] Int. Cl.$^6$ .................................................. G06F 12/10
[52] U.S. Cl. ........................ 711/210; 711/202; 711/205; 711/206; 711/207; 711/141
[58] Field of Search ..................... 711/3, 118, 128, 711/119, 147, 205, 202, 206, 207, 210, 141; 395/389, 206

[56] References Cited

U.S. PATENT DOCUMENTS

| | | | |
|---|---|---|---|
| 4,332,010 | 5/1982 | Messina et al. | 395/403 |
| 4,400,770 | 8/1983 | Chan et al. | 395/403 |
| 4,797,814 | 1/1989 | Brenza | 395/403 |
| 4,873,629 | 10/1989 | Harris et al. | 395/389 |
| 4,926,317 | 5/1990 | Wallach et al. | 711/3 |
| 5,148,538 | 9/1992 | Celtruda et al. | 395/415 |
| 5,623,626 | 4/1997 | Morioka et al. | 711/118 |

FOREIGN PATENT DOCUMENTS

| | | | |
|---|---|---|---|
| 1302444 | 6/1989 | Japan | G06F 12/08 |
| 2-21342 | 1/1990 | Japan | G06F 12/08 |

*Primary Examiner*—Eddie P. Chan
*Assistant Examiner*—Than V. Nguyen
*Attorney, Agent, or Firm*—Loudermilk & Associates

[57] ABSTRACT

Physical page information PA(a) corresponding to logical page information VA(a) as a cache tag address is retained in a logical cache memory 10 and in the event of a cache miss when a shared area is accessed, the physical page information PA (a) retained in the cache memory is compared with physical page information PA (b) resulting from the translation of a search address by TLB. When the result of the comparison is proved to be conformity, the cache entry is processes as a cache hit, so that the problem of a synonym arising from a case where the same physical address is assigned to different logical addresses is solved in such a manner that the number of times access is provided to TLB is halved as compared with the conventional arrangement.

13 Claims, 14 Drawing Sheets

MULTIPLE LOGICAL ADDRESS SPACE

LOGICAL ADDRESS EXTENDED BY ADDRESS SPACE IDENTIFIER

EXAMPLE OF CACHE ENTRY WITH SHARE FLAG SH

EXAMPLE OF SYNONYM

FIG. 6A

| CACHE ADDRESS PORTION | CACHE DATA PORTION |
|---|---|
| ADDRESS A | DATA C |
| ADDRESS B | DATA C |

THERE ARE A PLURALITY OF DATA ASSIGNED TO THE SAME PHYSICAL ADDRESS (DATA C) IN ONE LOGICAL CACHE MEMORY

FIG. 6B

| CACHE ADDRESS PORTION | CACHE DATA PORTION |
|---|---|
| ADDRESS A | DATA C |
| ADDRESS B | DATA D |

STATE WHERE DATA C ASSIGNED TO ADDRESS B AS SHOWN ON FIG. 6A IS REWRITTEN TO DATA D

LOGICAL ADDRESS PORTION

PHYSICAL ADDRESS PORTION

V  : VALID BIT
ASID : ADDRESS SPACE IDENTIFIER
PR  : PROTECTION
SH  : SHARE STATUS FLAG
    1 : PAGE SHARED BETWEEN PROCESSES
    0 : PAGE NOT SHARED BETWEEN PROCESSES
PA  : PHYSICAL PAGE INFORMATION
VA  : LOGICAL PAGE INFORMATION
    (LOGICAL PAGE NUMBER)

FORMAT OF ENTRY IN TLB

ADDRESS PORTION

DATA PORTION

```
V    : VALID BIT
ASID : ADDRESS SPACE IDENTIFIER
PR   : PROTECTION
SH   : SHARED FLAG
       1 : SHARE
       0 : NON-SHARE
PA   : PHYSICAL PAGE INFORMATION
VA   : LOGICAL PAGE INFORMATION
       (LOGICAL PAGE NUMBER)
DATA : DATA
```

FORMAT OF ENTRY IN LOGICAL CACHE MEMORY

FLOWCHART OF CACHE READ MISS CONTROL

PA(TLB) : PHYSICAL PAGE INFORMATION OBTAINED FROM TLB

PA(CACHE) : PHYSICAL PAGE INFORMATION CONTAINED IN CACHE ENTRY

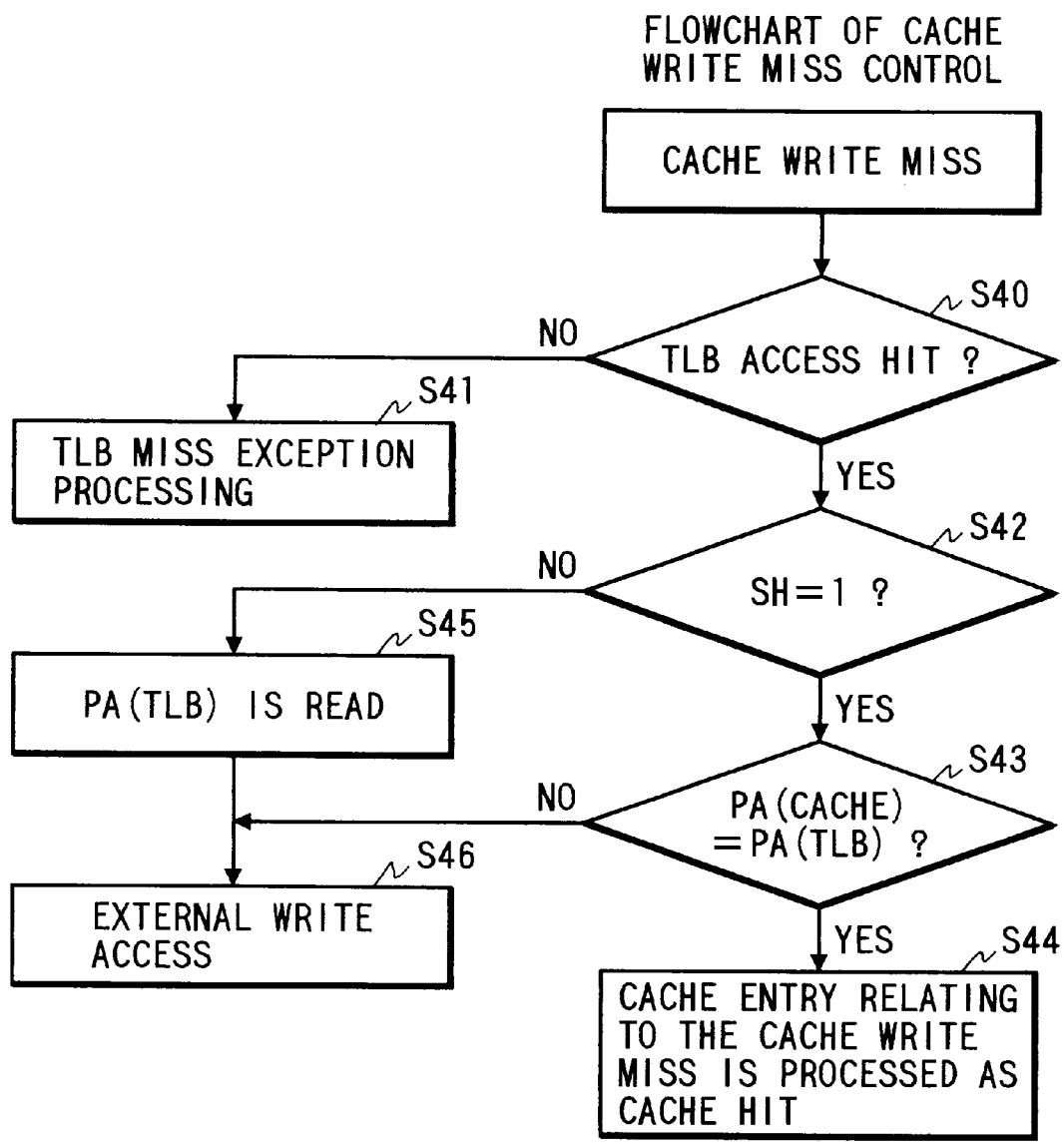

LOGICAL CACHE MEMORY STORING LOGICAL AND PHYSICAL ADDRESS INFORMATION FOR RESOLVING SYNONYM PROBLEMS

This application is a continuation of application(s) Ser. No. 08/420,539 filed on Apr. 12, 1995, now abandoned.

BACKGROUND OF THE INVENTION

The present invention relates to the technology of restraining power consumption in a data processor incorporating a logical cache memory and an address translation mechanism, and more particularly to technology effectively applicable to, for example, microcomputers or microprocessors.

In order to improve the performance of data processors, an approach has been made to incorporating a cache memory in such a data processor. In a field where operating systems (hereinafter also called "OS") are used for controlling memories without causing users to become conscious of physical memories or real memories, data processors are required to support address translation mechanisms. The address translation mechanism is a mechanism for translating logical addresses (or virtual addresses) into physical addresses to implement virtual memory.

Heretofore, there has also been adopted the technology of incorporating in a data processor a translation lookaside buffer (hereinafter simply called "TLB" too)) for retaining a translation pair of logical/physical addresses to run an address translation mechanism at high speed. Although the cache memory and TLB are required for improving data processing performance and supporting OS, importance is also attached to deterring TLB from operating as much as possible in parallel to the operation of the cache memory as far as restraining an increase in power consumption is concerned. Therefore, the physical cache memory retaining a pair of physical address information and data as cache entries will have to make a search address a physical address by regularly gaining access to TLB, which will result in increasing the power consumption, however. On the other hand, the logical cache memory retaining a pair of logical address information and data as cache entries will be allowed to make the search address a logical address by gaining access to TLB only at the time of a cache miss. Consequently, the logical cache memory is considered advantageous to the physical cache memory in view of a reduction in power consumption. Notwithstanding, the logical cache memory has posed the problem of a synonym.

The synonym will subsequently be described. First, each task in a multi-task OS has processes as a run environment. The processes includes the state of a data processor, an address space, and an address translation table for use in translating a logical address into a physical address. As shown in FIG. 3, for example, a logical address A is translatable into a physical address C in a process 1 and into a physical address D in a process 2; in other words, the contents of TLB ought to be altered when process-to-process switching is conducted in such a multiple physical address space. If, however, the entry is replaced each time the process-to-process switching is carried out by invalidating the contents of TLB, not only processing time but also power consumption will increase to the extent that such an increase cannot be disregarded.

For the reason stated above, an address space identifier (ASID) concept is introduced as shown in FIG. 4A, so that the logical address in the process 1 and the logical address in the process 2 are distinguished from each other by extending the logical address by means of the address space identifier. It becomes thus unnecessary to invalidate TLB each time the process-to-process switching is carried.

When the address space identifier is used to extend the logical address, there may arise a case where the processes 1, 2 share a physical address space between them as shown in FIG. 5; more specifically, there arises a case where the logical address A in the process 1 and the logical address B in the process 2 are translated into the same physical address C. The above case where the same physical address is assigned to different logical addresses is called a synonym.

Referring to FIGS. 6A, 6B, a description will subsequently be given of the problem caused by a synonym in the logical cache memory. Since the logical addresses A and B are different, two entries whose data are considered the same may exist simultaneously in the logical cache memory as shown in FIG. 6A. Now assuming that the data C assigned to the logical address B is changed to data D when what has been assigned to the logical address B is rewritten in that state as shown in FIG. 6B, though the data on the main memory corresponding to the address B is rewritten to D in the write-through manner, the data assigned to the logical address A on the cache memory corresponding thereto remains to be C, which mismatches the cache memory and the data stored in the main memory. When the reading of the data assigned to the logical address A occurs further, a cache hit takes place and the data C is used. The problem of a synonym thus arises.

In order to solve the problem of a synonym, a share flag concept may be introduced. The share flag is, for example, a flag for indicating whether a predetermined physical address space or data therein is commonly used in a plurality of different processes or logical address spaces. As shown in FIG. 4B, such a share flag SH is attached to the cache entry of a logical cache memory. When the data contained in the entry of the logical cache memory is shared data, the share flag SH is set to "1", and "0" when it is not.

A logical cache memory in a set-associative form in a case where such a share flag concept has been adopted is assumed to be in the state of FIG. 2.

When a logical address b (VA(b) represents logical page information such as a logical page number) is accessed in that state and when the entry selected thereby is a cache miss, that is, when the tag VA(a) of the entry thus selected does not represent the logical page information VA(b) assigned to the logical address b with the share flag SH of the entry being 1, a procedure below is to be followed without the addition of a new entry. Namely, the logical address b as a search address of the cache memory is subjected to address translation by means of TLB to obtain its physical address information PA(b). Further, the logical page information VA(a) of the tag selected then is used for address translation by means of TLB likewise to obtain physical address information PA(a). When a comparison of both bits of physical address information results in a good match, that is PA(a)=PA(b), this means that the logical address b shares data with the logical address a and the cache entry is processed as a cache hit. Consequently, a plurality of data are prevented from existing at the same physical address in the logical cache memory and the problem of the synonym can thus be solved.

Incidentally, Japanese Unexamined Patent Publication No. 302444/1989 discloses the art of subjecting to address translation two logical addresses in the tag portion of the cache as well as a search address when the reading of the cache memory has proved the presence of shared data, and comparing both so as to deal with a cache hit on condition that the result of the comparison is proved to be conformity.

SUMMARY OF THE INVENTION

The present inventors found that the measures taken to cope with synonyms when the aforementioned cache memory was employed still remained unsatisfactory to solve the problem of increased power consumption because TLB had to be accessed twice.

With respect to power consumption resulting from gaining access to TLB, moreover, TLB has to be accessed to translate the logical address into a physical address even at the time of a cache write hit and the present inventors proved the fact that the amount of power consumption was also increased thereby.

An object of the present invention is to provide a data processor capable of decreasing the number of times access is provided to TLB, which is essential to deal with the problem of a synonym.

Another object of the present invention is to provide a data processor which allows the omission of gaining access to TLB at the time of a cache write hit.

Still another object of the present invention is to provide a data processor designed to make power consumption reducible at the time TLB is accessed.

These and other objects and novel features of the present invention will become more apparent by referring to the following description and appended drawings.

A brief description will subsequently be given of an exemplary embodiment of the invention as disclosed in the present application for a patent.

(1) A data processor comprises a logical cache memory (10) with logical address information as search information, a translation lookaside buffer (11) for storing a translation pair for translating a logical address into a physical address, and control means for controlling the logical cache memory and the translation lookaside buffer, the logical cache memory having an area for use in retaining physical address information corresponding to the logical address information (physical page information PA in the data portion of a cache entry as shown in FIG. 9).

In a case where a desired logical address shares a physical address space with the other logical addresses when the cache entry selected by the search information (e.g., part of the offset data assigned to the logical address) from the logical cache memory does not correspond to the desired logical address, the control means compares the physical address information (e.g., physical page information PA) retained by the cache entry thus selected with the physical address information obtained from the translation lookaside buffer, and renders utilizable the information retained by the cache entry thus selected on condition that the result of the comparison is proved to be conformity.

(2) From another viewpoint of utilizing physical address information such as the physical page information contained in the cache entry, control means makes the physical address retained by the cache entry thus selected utilizable for the generation of a physical address to be written into a physical address space when the cache entry selected by search information corresponds to the desired logical address.

(3) The control means for controlling both the aforementioned comprises cache address comparator means (202) for detecting that the cache entry selected by the search information from the cache memory does not correspond to a desired logical address and that the desired logical address shares a physical address space with the other logical addresses, physical address comparator means (204) for comparing the physical address information retained by the cache entry thus selected with physical address information obtainable from the translation lookaside buffer to detect conformity therebetween on the basis of the detections made by the cache address comparator means, a data controller (301) for utilizing the information retained by the cache entry thus selected when the result of comparison made by the physical address comparator means is proved to be conformity, and an address controller (300) for utilizing the physical address retained by the cache entry thus selected for the generation of a physical address to be written into the physical address space when the cache entry selected by the search information from the logical cache memory corresponds to the desired logical address in write processing.

(4) In consideration of a case where an address translation mechanism supports variable page size, a translation lookaside buffer in a full-associative form may be used as another translation lookaside buffer in place of the aforesaid translation lookaside buffer when the logical page size is altered.

When a cache miss occurs in a case where information such as the physical page information PA corresponding to the logical page information VA as a cache tag address is stored in the logical cache memory 10 to gain access to a shared area, the physical page information PA retained by the logical cache memory is compared with the physical page information PA translated from the search address in the translation lookaside buffer so as to process the cache entry as a cache hit on condition that the result of the comparison is proved to be conformity, whereby the problem of a synonym arising from a case where the same physical address is assigned to different logical addresses is solved in such a manner that the number of times access is provided to the translation lookaside buffer is halved.

At the time of a cache write hit with respect to the translation lookaside buffer, it is not necessary at all to gain access to the translation lookaside buffer at the time of the cache write hit in the case of generating a physical address for external write access by means of the physical page information PA in the cache entry relating to that hit.

The use of the logical cache memory not only makes power consumption reducible but also renders access to the translation lookaside buffer omissible at the time of the cache hit. For this reason, moreover, the overall power consumption intended for access to the translation lookaside buffer also becomes reducible as it is needed to gain access to the translation lookaside buffer only at the time of the substantial cache miss.

When the address translation mechanism supports the variable page size, the technique of gaining access to the translation lookaside buffer employing a set-associative form will have to be varied with the page size. In such a case, there are provided one translation lookaside buffer in the set-associative form corresponding to the typical page size and another translation lookaside buffer in the full-associative form; the former translation lookaside buffer is used in the case of such a typical page size, whereas the latter translation lookaside buffer is used for other page sizes.

BRIEF DESCRIPTION OF THE DRAWINGS

FIGS. 6A and 6B are diagrams illustrating the problem of a synonym in the logical cache memory.

FIG. 14 is an operation control flowchart of the logical cache memory in the event of a cache write miss.

DESCRIPTION OF THE PREFERRED EMBODIMENTS

Figure 7:
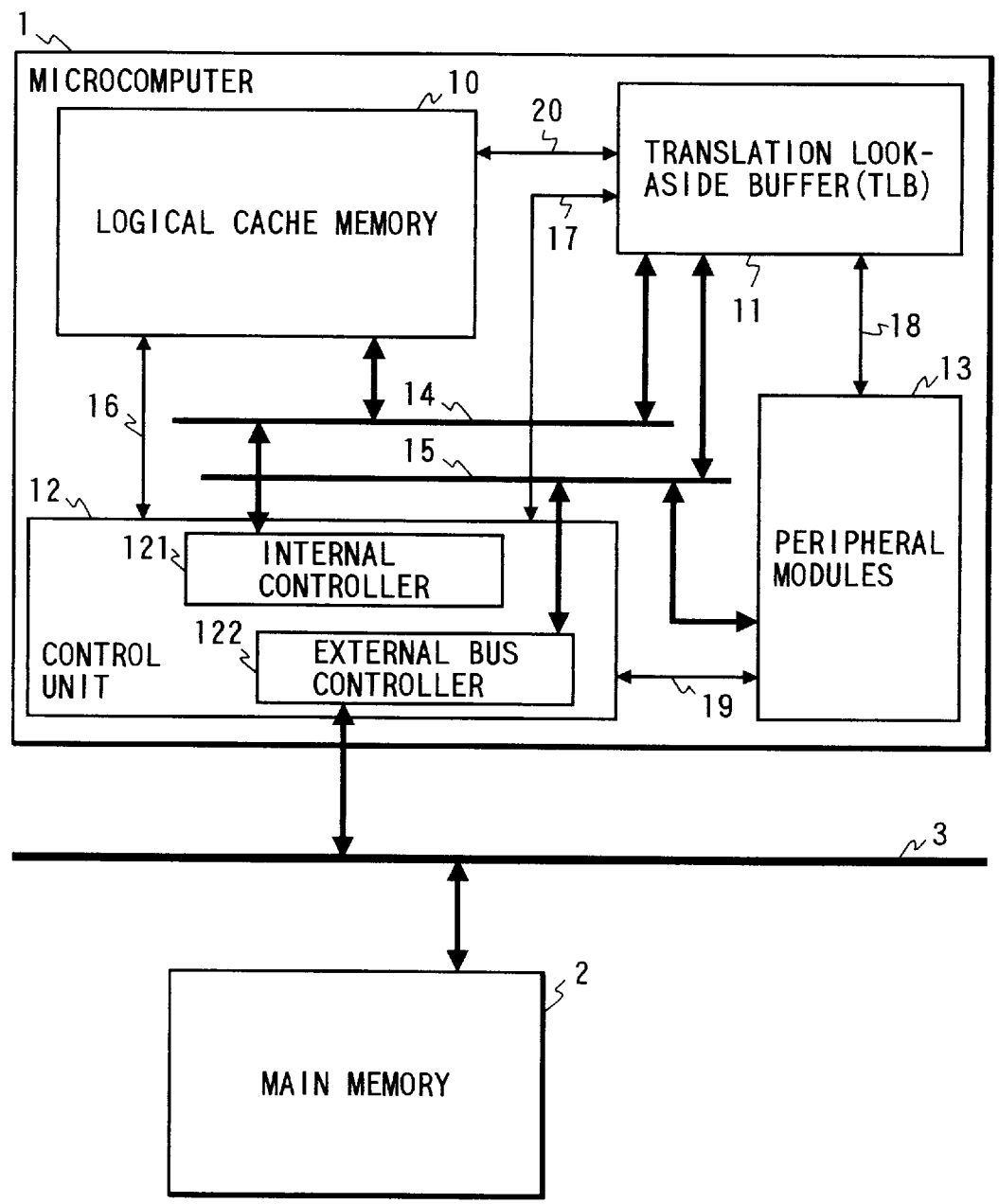
FIG. 7 is a block diagram of a microcomputer as a data processor embodying the present invention.

FIG. 7 is a block diagram of a microcomputer as a data processor embodying the present invention. A microcomputer (or microprocessor) 1 contains, not exclusively, a logical cache memory 10, a translation lookaside buffer 11 (hereinafter simply called "TLB" too)), a control unit 12, and peripheral modules 13, these being coupled to internal buses 14, 15, for example, and formed on one semiconductor substrate (or chip) made of silicon.

The control unit 12 is a circuit block which generally functions as control circuits for controlling a central processing unit, a bus controller, the logical cache memory 10 and the TLB 11 above and further as an external interface circuit. In FIG. 7, there are exemplarily shown an internal controller 121 and an external bus controller 122 in the circuit block functioning as an input-output control unit relative to the inside and outside of the chip. The logical cache memory 10, the TLB 11 and the internal controller 121 are connected to the internal bus 14, whereas the TLB 11, the peripheral modules 13 and the external bus controller 122 are connected to the internal bus 15. The peripheral modules 13 properly include the following peripheral circuits (not shown): a timer, a serial interface communication interface, RAM (Random Access Memory), ROM (Read Only Memory), and DMAC (Direct Memory Access Controller). In FIG. 7, reference numeral 16 denotes a group of control signal lines with respect to the logical cache memory 10; 17, a group of control signal lines with respect to the TLB 11; 18, a group of control signal lines between the TLB 11 and the peripheral modules 13; 19, a group of control signal lines with respect to the peripheral modules 13; and 20, a group of control signal lines between the logical cache memory 10 and the TLB 11. The microcomputer 1 in this embodiment of the invention is connected via, but not limited to, an external bus 3 to a main memory 2. In this embodiment of the invention, the TLB 11 and the circuits in the control unit 12 for controlling the former constitute an address translation mechanism for realizing virtual memory.

Figure 8:
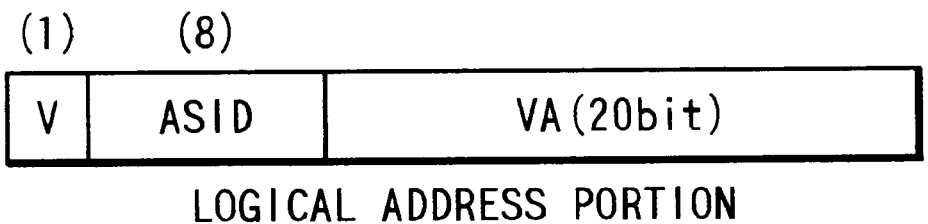
FIG. 8 shows an example of a format of entry in TLB.
Figure 8:
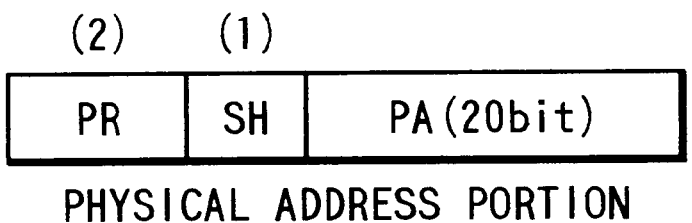

FIG. 8 shows an example of a format of entry in TLB 11. One entry contains a logical and a physical address portion.

The logical address portion has a valid bit V (1 bit) indicating that the entry is valid, an address space identifier (an identification number) ASID (8 bits) and logical page information VA (20 bits).

The physical address portion has a protection PR (2 bits) for memory protection, physical page information PA (20 bits) corresponding to the physical page in the logical address portion and a share flag SH (1 bit) indicating whether the physical page designated by the physical page information is shared among a plurality of physical pages.

In accordance with this embodiment of the invention, the logical page information and offset information in the logical page specified by the logical page information constitute the logical address. The size of one logical page is determined by the number of bits of the offset information. The logical page size is assumed constant in this embodiment of the invention. When a logical address is translated into a physical address, physical page information is obtained from an entry corresponding to the logical page information of the logical address, and the logical address is made available by concatenating the offset information of the logical address on the low order side of the physical page information.

Figure 9:
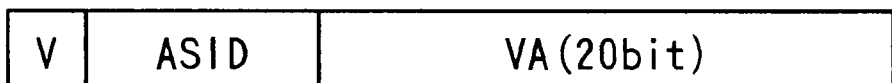
FIG. 9 shows an example of a format of entry in the logical cache memory.
Figure 9:

FIG. 9 shows an example of a format of entry in the logical cache memory 10. One entry contains an address and a data portion.

The address portion is the same as the logical address portion of the TLB 11 and retains a valid bit V (1 bit) indicating that the entry is valid, an address space identifier ASID (8 bits) and logical page information VA (20 bits).

The data portion is formed by concatenating 16-byte data to the physical address portion of the TLB 11 and additionally retains a protection PR (2 bits) for memory protection, a share flag SH (1 bit) indicating whether logical page shares data with other logical pages, physical page information PA (20 bits) corresponding to the logical page in the address portion.

What demands special attention in this case is that though the concept of the address space identifier together with the share flag has been adopted in the logical cache memory 10 and the TLB 11, the logical cache memory 10 possesses the physical page information PA so as to decrease the number of times access is provided to TLB. The physical page information PA stored in the data portion of a cache entry is made available via the TLB 11 when an entry is initially registered in the logical cache memory 10 because of a cache miss, for example.

Figure 1:
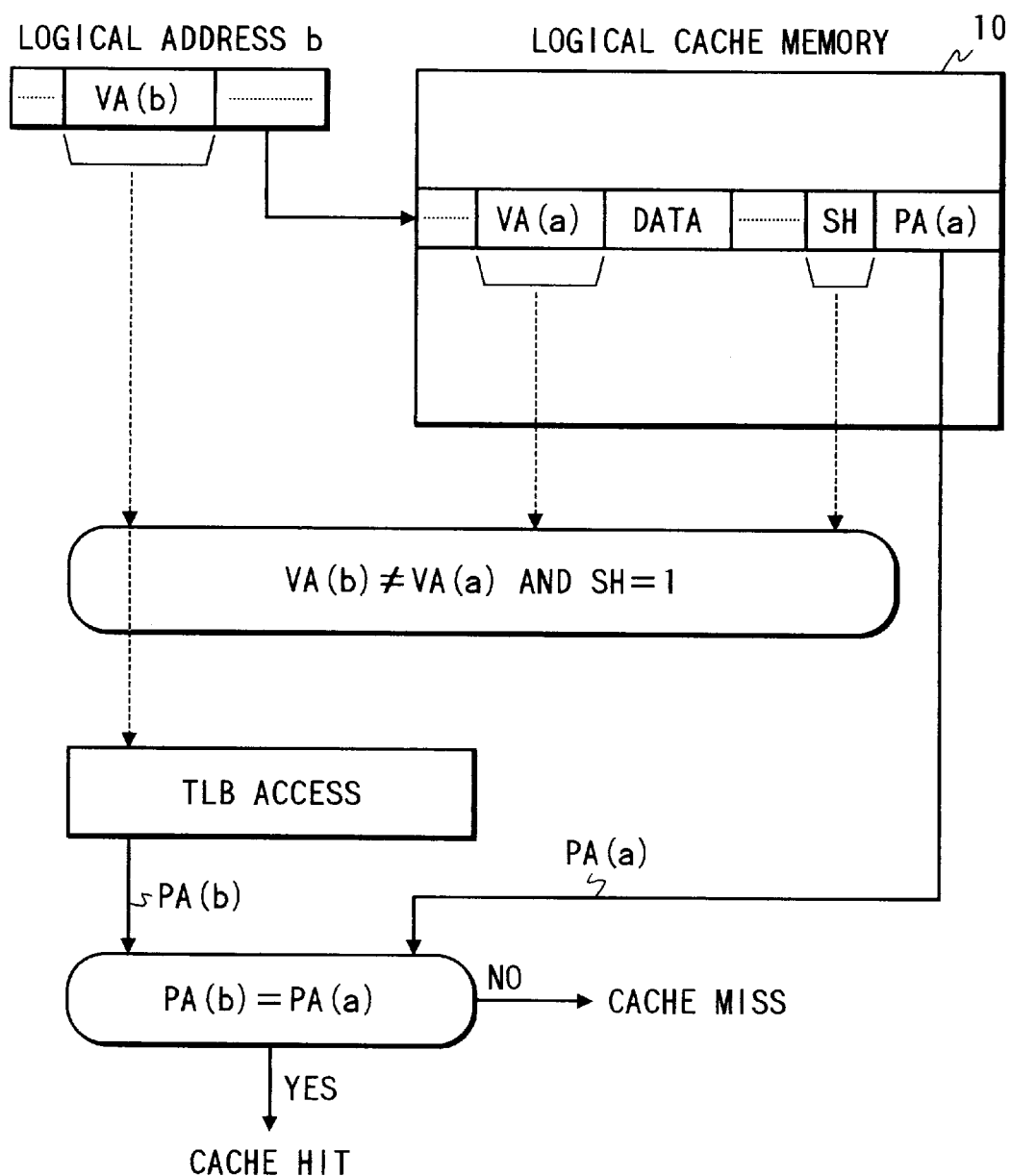
FIG. 1 is a conceptual diagram illustrating the technique of controlling a logical cache memory to solve the problem of a synonym in a data processor according to the present invention.
Figure 2:
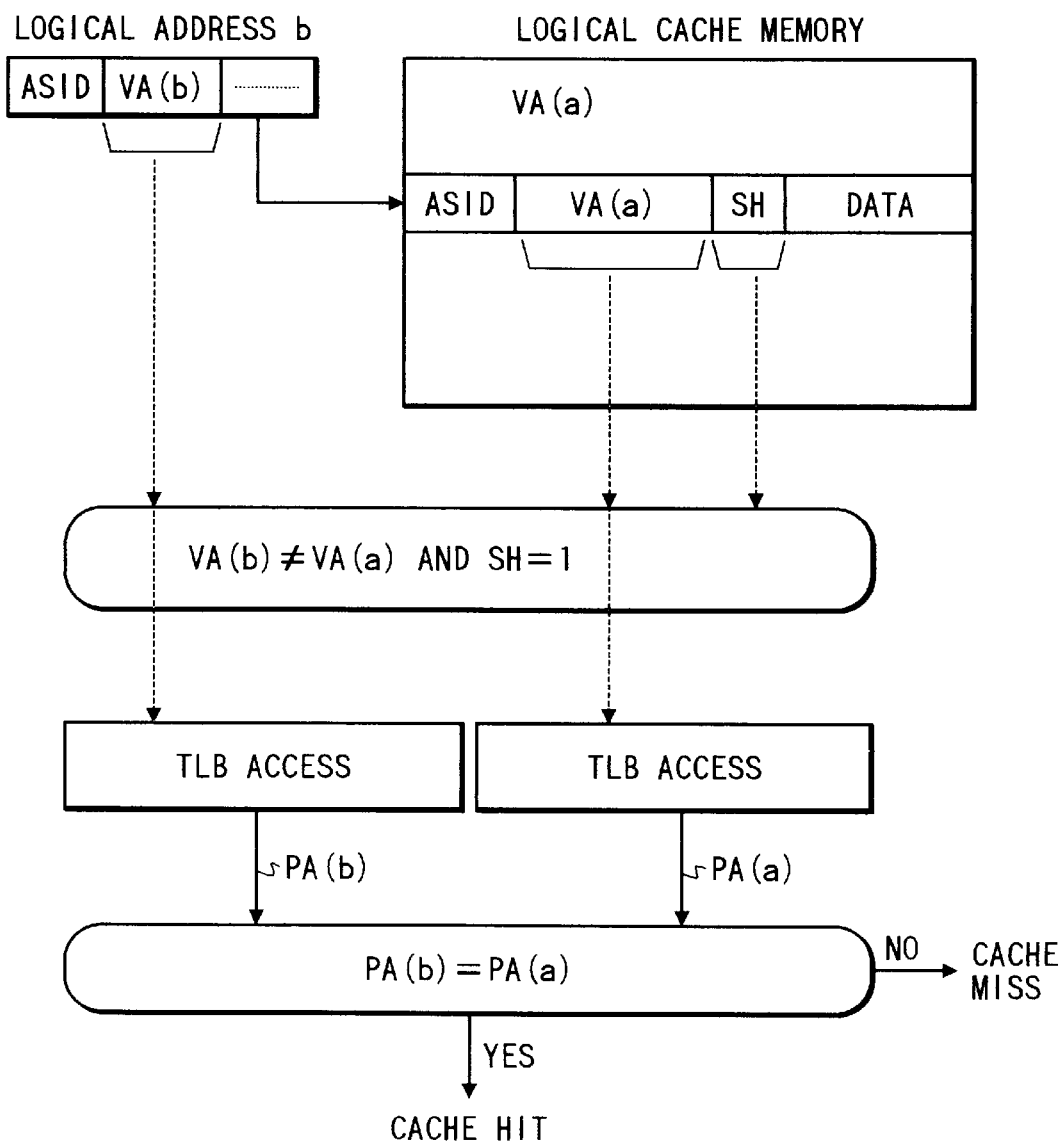
FIG. 2 is a conceptual diagram illustrating the technique of controlling the logical cache memory to solve the problem of a synonym without any physical address included in a cache entry.
Figure 3:
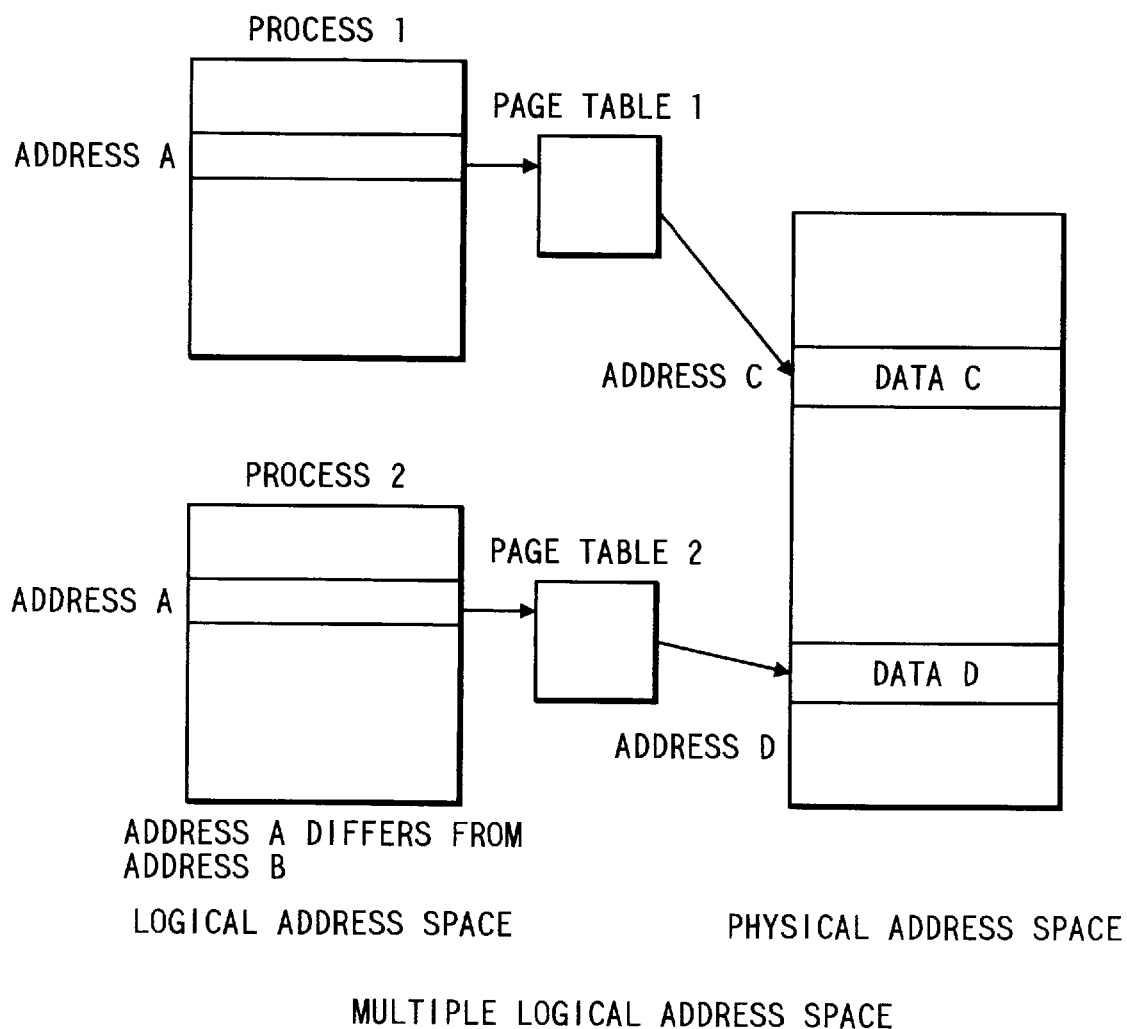
FIG. 3 is a diagram illustrating a multiple physical address space.
Figure 4A:
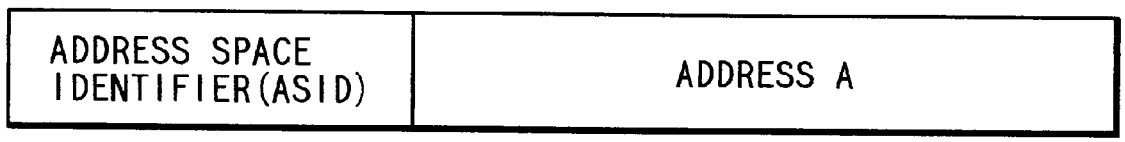
FIG. 4A is a format chart showing an example of a logical address extended by an address space identifier.
Figure 4B:
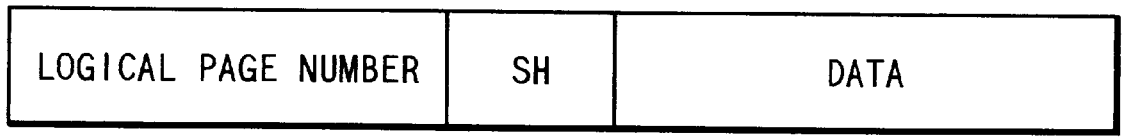
FIG. 4B a format chart showing an example of a cache entry with a share flag.
Figure 5:
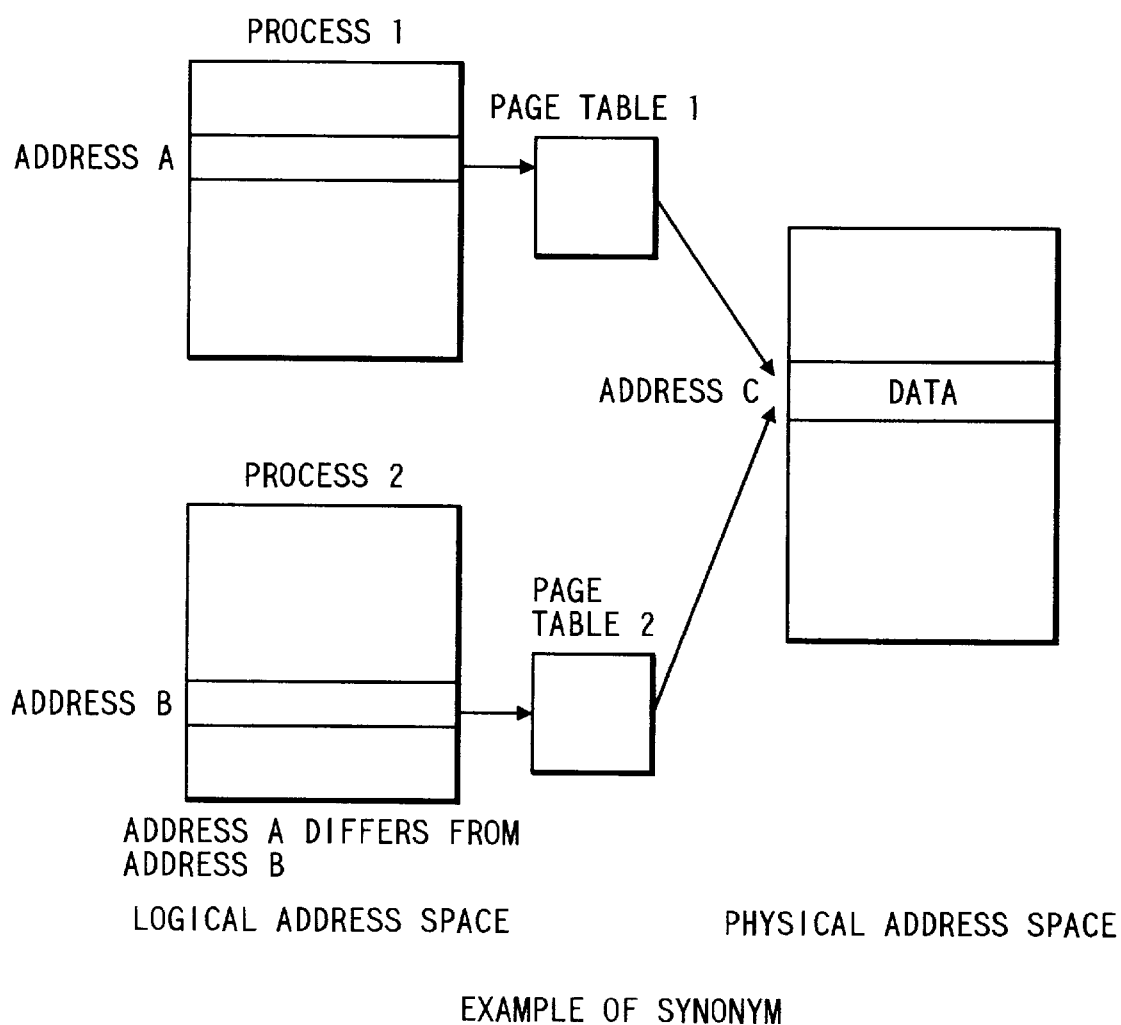
FIG. 5 is a diagram illustrating the concept of a synonym.

In FIG. 1, there is shown a conceptual diagram illustrating the technique of controlling the logical cache memory 10 to solve the problem of a synonym as noted above. In an exemplary cache entry of FIG. 1, VA(a) represents logical page information like a logical page number corresponding to a logical address a and so does PA(a) the physical page information assigned to a physical address corresponding to the logical address a. When a logical address b (VA(b) represents its logical page information) is accessed in that state and when the entry selected thereby is a cache miss, that is, when the tag VA(a) of the entry thus selected does not conforms to the logical page information VA(b) assigned to the logical address b with the share flag SH of the entry being 1, a procedure below is followed without the addition of a new entry. Namely, the logical address b as a search address of the cache memory 10 is subjected to address translation by means of the TLB 11 to obtain its physical address information PA (b). The physical page information PA(b) is compared with the physical page information PA(a) retained by the entry thus selected. In a case where the cache entry has no physical page information as shown in FIG. 2, TLB has to be accessed to translate logical page information in the entry thus selected into physical page information. Therefore, the number of times access is provided to the TLB 11 is halved in this embodiment of the invention in comparison with that of FIG. 2 and power consumption becomes reducible to that extent.

When a comparison between both the physical addresses results in a good match, that is, PA(a)=PA(b), data in the entry is used as a cache hit because it is assumed that the logical address b shares data with the logical address a. Consequently, a plurality of data assigned to the same physical address are prevented from existing in the logical cache memory and the problem of a synonym is solved.

Since the hit entry retains the corresponding physical page information PA at the time of a cache write hit (a cache hit within write access), though not shown, in the logical cache memory 10 in this embodiment of the invention, it is unnecessary to gain access to the TLB 11 again to obtain a physical address for writing data to the main memory arranged in a physical address space. Not only the number of times access is provided to the TLB 11 but also power consumption is thus made reducible.

Figure 10:
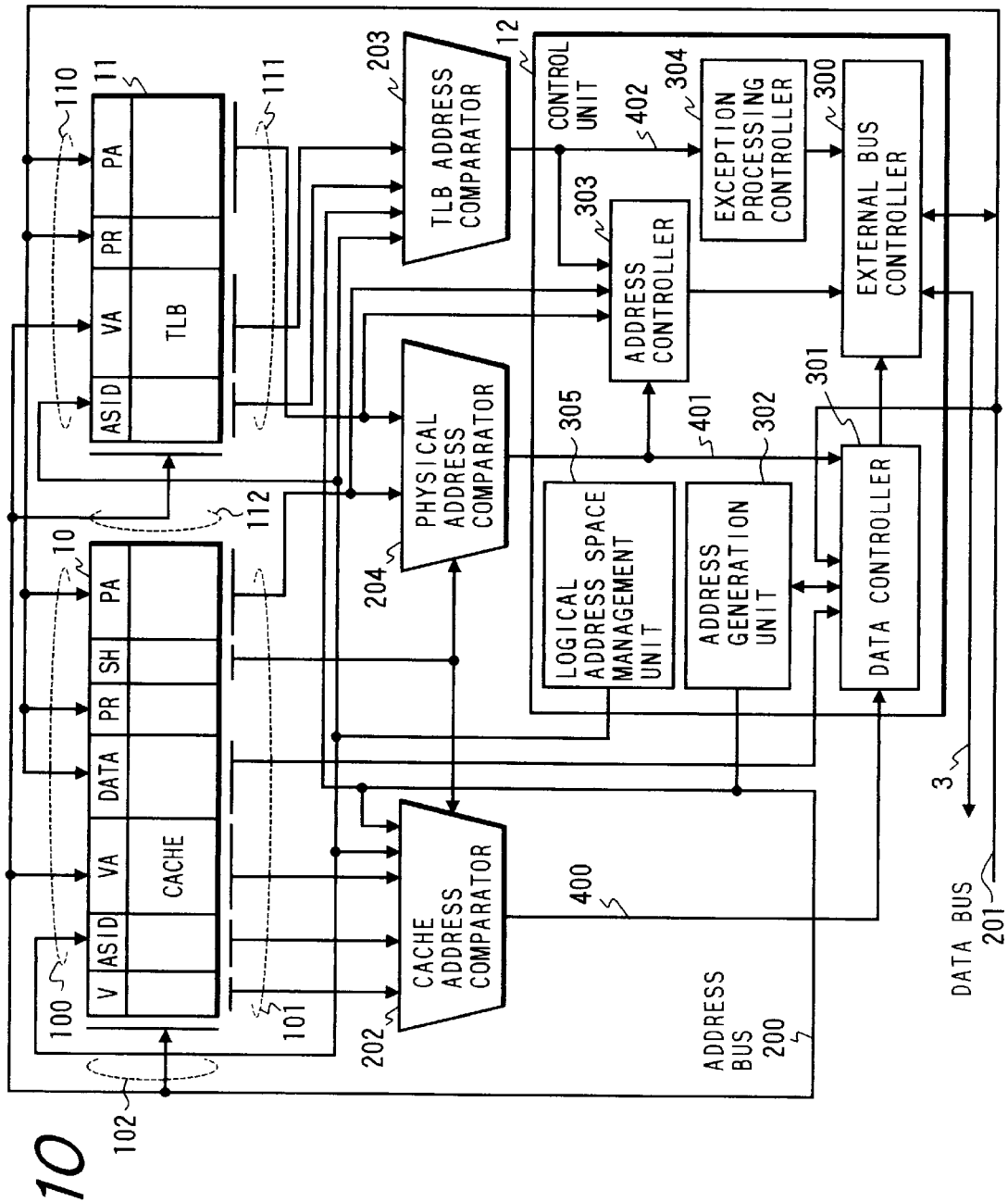
FIG. 10 is a block diagram illustrating in detail the logical cache memory, TLB and the control unit shown in FIG. 7.

FIG. 10 is a block diagram illustrating in detail the logical cache memory 10, the TLB 11 and the control unit 12. In FIG. 10, attention is mainly directed to the control of the logical cache memory 10 and the TLB 11.

In the logical cache memory 10 of FIG. 10, reference numeral 100 generically denotes a write data input interface; 101, a read data output interface; and 102, an access address signal input interface. An address signal for gaining access to the logical cache memory 10 is assumed, not exclusively, part of offset information contained in the logical address supplied to an address bus 200. In a case where access is then intended for writing, data in a cache entry are supplied to the input interface 100 via an address bus 200 and a data bus 201. In a case where access is intended for reading, data in the cache entry are read outward in parallel from the output interface 101. The cache entry is arranged as described by reference to FIG. 9.

As noted previously, the logical cache memory 10 is in the set-associative form and part of offset information is used for its access address. For example, assuming 32 bits in total are used to define the logical address; namely, 20 high-order bits and 12 low-order bits are assigned to the logical page information and the offset information, respectively, 4K bytes are used for one page. When 8-bit offset information excluding 4 low-order bits is used for the access address of the logical cache memory 10 at this time, data DATA in the cache entry are read and written in 16 bytes.

In the TLB 11 of FIG. 10, reference numeral 110 generically denotes a write data input interface; 111, a read data output interface; and 112, an access address signal input interface. An address signal for use in gaining access to the TLB 11 is made, not exclusively, part of information assigned to the logical address supplied to the address bus 200, for example offset information and this is because the set-associative form is employed for the TLB 11 like the cache memory in this embodiment of the invention. When access is then intended for writing, entry data are supplied to the input interface 110 via the address bus 200 and the data bus 201. When access is then intended for reading, data in the cache entry are read outward in parallel from the output interface 111. The contents of entry data in TLB are similar to those described by reference to FIG. 8.

In FIG. 10, reference numeral 202 denotes a cache address comparator; 203, a TLB address comparator; and 204, a physical address comparator. In the control unit 12, moreover, there are exemplarily shown an external bus controller 300, a data controller 301, an address generation unit 302, an address controller 303, an exception processing controller 304, and a logical address space management unit 305. In the circuit block shown in the control unit 12, attention is mainly directed to the control of the logical cache memory 10 and the TLB 11; consequently, an instruction control system for controlling a program fetch and instruction execution sequence in CPU has been omitted therein. The cache address comparator 202, the TLB address comparator 203 and the physical address comparator 204 also constitute part of means for controlling the logical cache memory 10 and the TLB 11, and these may be arranged with special hardware such as comparators or otherwise with a combination of a central processing unit and software.

The address generation unit 302 generates logical page information and offset information constituting a logical address processwise and feeds the address bus 200 with the information. The logical address space management unit 305 outputs an address space identifier (ASID) in accordance with the present process.

The data controller 301 has various operating units, a number of registers or work areas and the like, functions as an executive member of CPU so as to compute data, and exercises control over cutting data corresponding to a logical address out of data in bytes read from the logical cache memory 10 involved. The exception processing controller 304 controls the process of writing a page entry corresponding to the logical address involved from a page table on the main memory to TLB in the event of, for example, a TLB miss.

The address controller 303 controls the utilization of the physical page information PA read from the logical cache memory 10 and that of the physical page information PA read from the TLB 11 in order to generate a physical address. When the logical cache memory 10 is hit in the case of write access, for example, the physical page information PA contained in the cache entry relating to the hit is used to generate a physical address for use in external access.

The cache address comparator 202 compares the logical page information VA read from the logical cache memory 10 with the logical page information output from the address generation unit 302 and also compares the address space identifier (ASID) read from the logical cache memory 10 with the address space identifier (ASID) output from the logical address space management unit 305. When the share flag SH read from the logical cache memory 10 is "1", the address space identifier is excluded from objects for comparison. The results of comparison are output as a logical address miss/match signal 400, and the signal in question is set at an active level only when the valid bit V is valid and when the results of comparison are proved to be conformity; in other cases, the signal is made inactive. When the logical address miss/match signal 400 is set at the active level (this condition is also called "cache hit"), the data controller 301 makes use of the data DATA in the cache memory 10 to carried out predetermined computations or otherwise the data is supplied to the external bus controller 300 so that it may be used for external access.

The physical address comparator 204 compares the physical page information PA output from the logical cache memory 10 with the physical page information output from the TLB 11. The result of comparison is output as a physical address miss/match signal 401. The conditions under which the physical address miss/match signal 401 is set to the active level include cases where the comparison made by the cache address comparator 202 results in a cache miss (logical address miss/match signal 401 is inactive), where the valid bit (not shown) remains valid, where the share flag SH is "1" (share), and where the comparison made by the physical address comparator 204 results in a good match. When the physical address miss/match signal 401 is set to the active level, the control unit 12 performs the same process as in the event of a cache hit, despite the inactive level of the logical address miss/match signal 400. This control mode coincides with the contents described by reference to FIG. 1.

The TLB address comparator 203 compares the logical page information VA read from the TLB 11 with the logical page information that the address generation unit 302 outputs and also compares the address space identifier (ASID) read from the TLB 11 with the address space identifier that the logical address space management unit 305 outputs. When the share flag SH read from the TLB 11 is "1", the address space identifier is excluded from objects for comparison. The result of comparison is output as a TLB miss/match signal 402, and the signal in question is set at an active level only when the valid bit V is valid and when the results of comparison are proved to be conformity; in other cases, the signal is made inactive. When the TLB miss/match signal 402 is made inactive (this condition is also called "TLB miss"), the exception processing controller 304 controls the external bus controller 300, whereby the page entry of the TLB 11 corresponding to the then logical address is written from the page table into the main memory to the TLB 11. The TLB miss/match signal 402 is set at the active level (this condition is also called "TLB hit") and when external access utilizing the physical page information PA is needed, the address controller 303 supplies the physical page information to the external bus controller 300 and thereby access is gained to the physical address space of, for example, the main memory.

Figure 11:
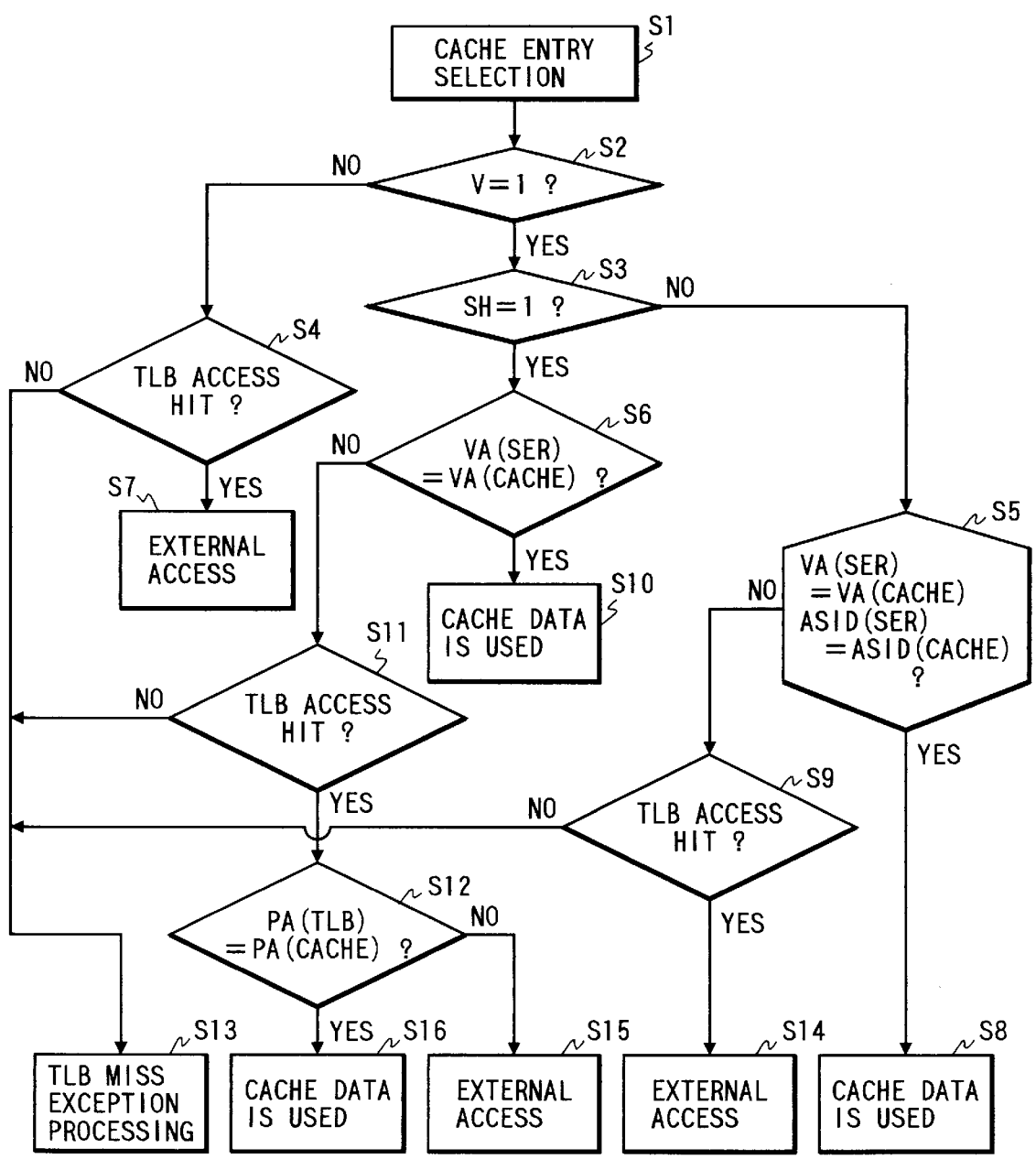
FIG. 11 is an overall control flowchart of the logical cache memory.

FIG. 11 is an overall control flowchart over the logical cache memory 10. According to this flowchart, a description will be given of control operations over the logical cache memory 10 and the TLB 11.

First, the offset information assigned to the search logical address is used to select one cache entry from the logical cache memory 10 (Step S1). The valid bit V is checked with the cache entry selected and whether the cache entry is valid or invalid is determined (Step S2). When (V=0), that is, invalid, the TLB 11 is accessed to provide external access (Step S4). In the event of a TLB hit, the external access is gained with the physical address contained in the entry of the TLB 11 (Step S7). In the event of a TLB miss, the exception processing of the TLB miss occurs and OS causes a page entry corresponding to the logical address to be fetched from the page table on the memory to the TLB 11 (Step S13). Upon completion of the exception processing, the TLB hit condition at Step S4 is established and the external access at Step S7 is provided.

When the valid bit V is decided to be valid (V=1) at Step S2, the share flag SH is subsequently checked (Step S3). When SH=1, that is, when data in the cache entry thus selected is share data, logical page information VA (SER) assigned to the search logical address is compared with logical page information VA (CACHE) as a cache address in the cache entry (Step S6) and data DATA in the cache entry is used when the result of the comparison is proved to be conformity (Step S10). When the result of the comparison above is proved to be nonconformity, the TLB 11 is searched with the logical page information VA (SER) assigned to the search logical address (Step S11). As a result, corresponding physical page information PA (TLB) is obtained in the case of the TLB hit. Then the physical page information PA (TLB) is compared with physical page information PA (CACHE) contained in the cache entry (Step S12). When the result of the comparison is proved to be conformity, it is assumed that the search logical address and the logical address in the cache entry have been assigned to the same physical address and therefore the cache entry in question becomes usable substantially as in the case of the cache hit (Step S16). When the result of the comparison at Step S12 is proved to be nonconformity, the cache miss condition remains unchanged and the external access is provided (Step S15). Incidentally, exception processing is performed at Step S13 when the TLB is decided at Step S11. Upon completion of the exception processing, the TLB hit condition at Step S11 is established and the process flow proceeds to Step S12.

When the decision made at Step S3 results in SH=0, that is, in the case of non-shared data, the address space identifier is not disregarded at the time of address comparison. Then the logical page information VA (SER) of the search logical address and the address space identifier ASID (SER) are respectively compared with the logical page information VA (CACHE) as the cache address contained in the cache entry and the address space identifier ASID (cache) (Step S5). When the result of the comparison is proved to be conformity, information in the cache entry is used (Step S8) and in the case of read access, this data is used. In the case write access, the physical page information contained in the cache entry is used for writing to the physical address space. When the decision made at Step S5 results in nonconformity, the TLB 11 is accessed (Step S9) and in the event of the TLB hit, the physical page information obtained thereby is used to provide the external access (Step S14), whereas in the event of the TLB miss, the exception processing at Step S13 is performed.

Figure 12:
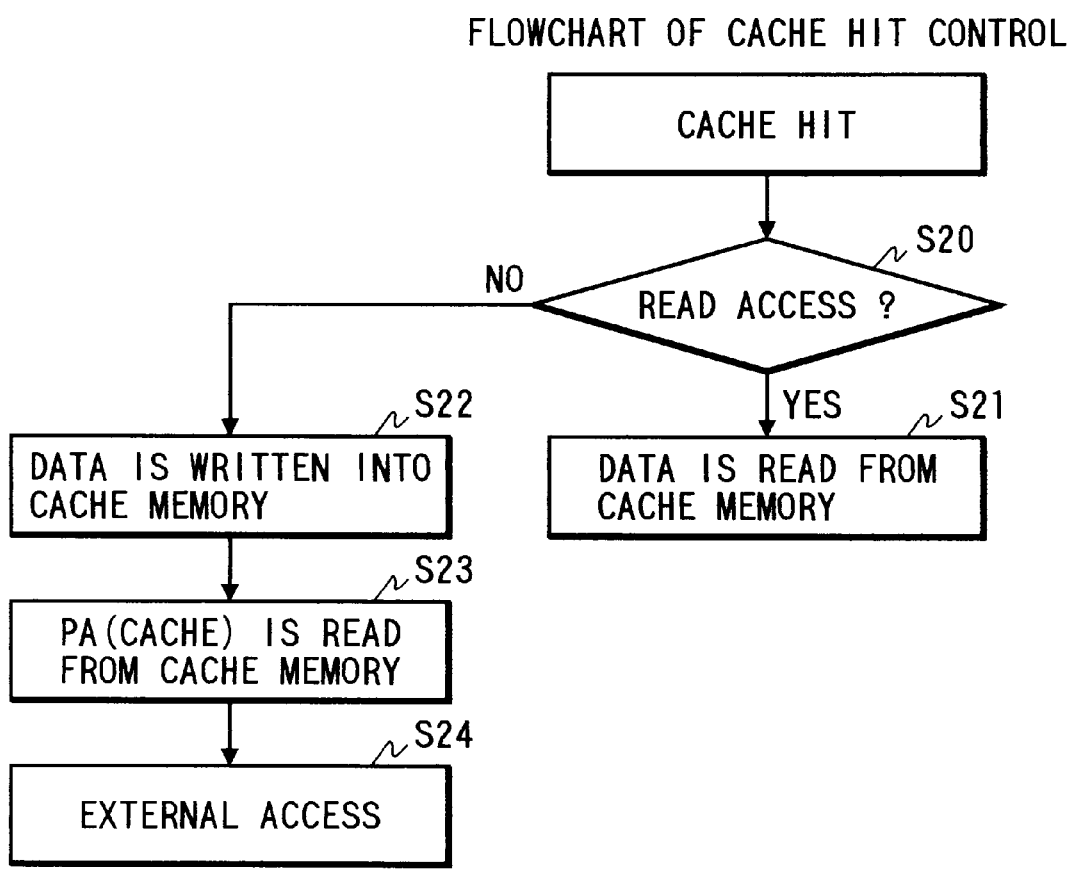
FIG. 12 is an operation control flowchart of the logical cache memory in cases of cache read/write hits.
Figure 13:
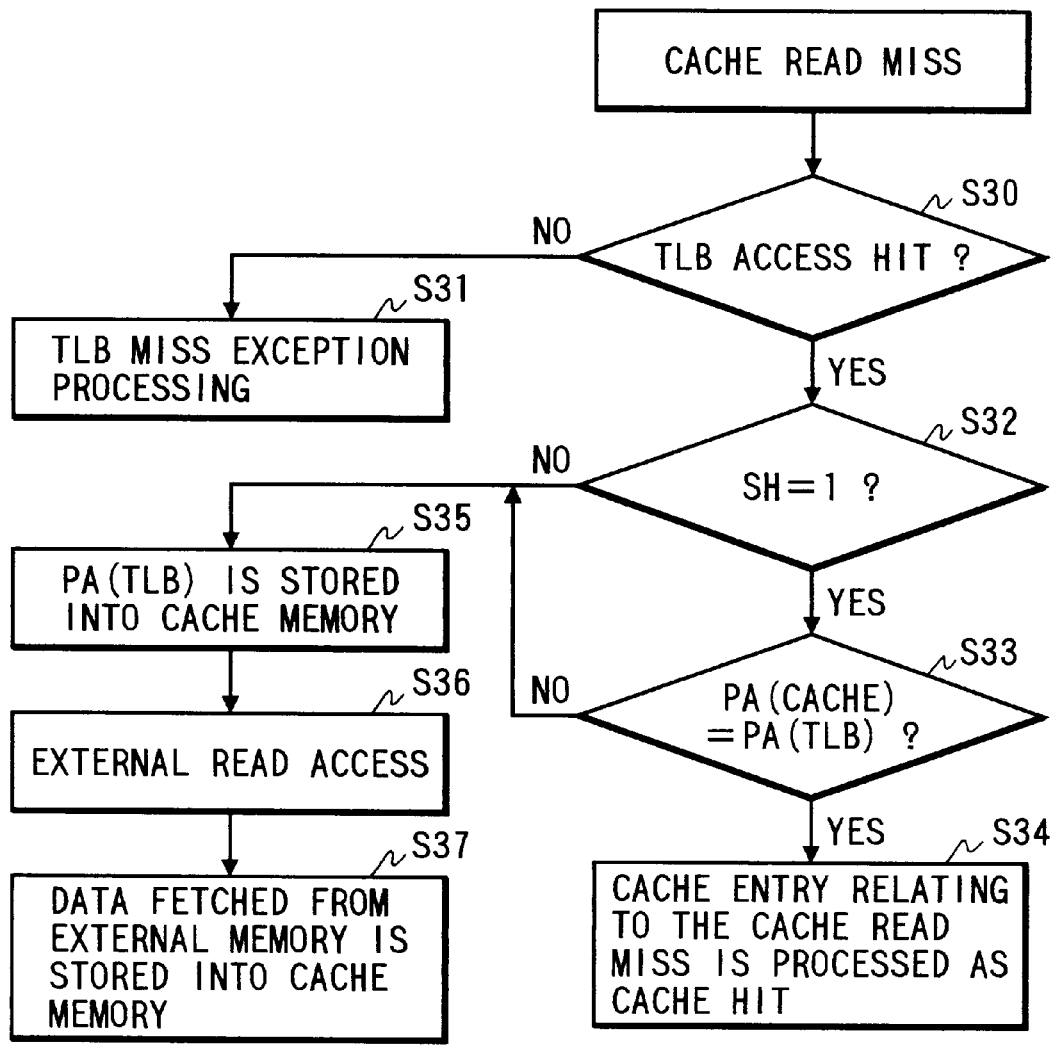
FIG. 13 is an operation control flowchart of the logical cache memory in the event of a cache read miss.

FIGS. 12, 13, 14 indicate representative operating modes of the cache memory, wherein there are shown operation control flows in the cache memory with special attention directed to four modes of a cache read hit, a cache write hit, a cache read miss and a cache write miss. Their contents are substantially similar to those described by reference to FIG. 11 only with a difference in descriptive viewpoints.

FIG. 12 is an operation control flowchart of the logical cache memory in cases of cache read/write hits. At the time of a cache read hit, read data is defined as a corresponding data portion contained in the cache entry selected by the offset information of the logical address (Step S21). At the time of a cache write hit, write data is written into the cache entry selected by the offset information of the logical address (Step S22). Subsequently, the physical page information PA (CACHE) is read from the cache entry (Step S23) and by utilizing the information, the write data is written into the main memory (Step S24). At Step S20, a decision is made on whether to provide read or write access at that time. The detailed contents at Steps S20~S24 of FIG. 12 are equivalent in value to the contents at Steps S8, S10, S16 of FIG. 11.

FIG. 13 is an operation control flowchart of the logical cache memory in the event of a cache read miss. On condition that, in the event of the cache read miss, the physical page information PA (CACHE) contained in the cache entry relating to the cache miss conforms to the physical page information PA (TLB) relating to the TLB hit against the search logical address (Step S33) when the TLB hit is decided at Step S30 and when the share flag SH=1 is decided at Step S32, the cache entry relating to the cache read miss this time is processed as a cache hit (Step S34).

When the TLB miss is decided at Step S30, the exception processing of the TLB miss is performed (Step S31). When SH=0 is decided at Step S32 or when nonconformity is determined at Step S33, the physical page information PA (TLB) obtained from the TLB hit at Step S30 is stored in the cache memory (Step S35). Subsequently, external read access is provided by utilizing the physical page information (Step S36) and further the logical page information of the logical address relating to the read data and the cache miss is stored in the cache memory (Step S37). When data are stored in the cache memory at Steps S35 and S37, the write destination is determined by part of the offset information of the logical address relating to the cache miss. The detailed contents at Steps S35, S36, S37 of FIG. 13 are equivalent in value to the contents at Steps S14, S15 of FIG. 11.

FIG. 14 is an operation control flowchart of the logical cache memory in the event of a cache write miss. On condition that, in the event of the cache write miss, the physical page information PA (CACHE) contained in the cache entry relating to the cache miss conforms to the physical page information PA (TLB) relating to the TLB hit against the search logical address (Step S43) when the TLB hit is decided at Step S40 and when the share flag SH=1 is decided at Step S42, the cache entry relating to the cache write miss this time is processed as a cache hit (Step S44).

When the TLB miss is decided at Step S40, the exception processing of the TLB miss is performed (Step S41). When SH=0 is decided at Step S42, the physical page information PA (TLB) obtained from the TLB hit at Step S40 is read out (Step S45) and external read access is provided by utilizing the physical page information (Step S46). When nonconformity is decided at Step S43, the physical page information PA (TLB) obtained from the TLB hit at Step S40 is used to provide external write access (Step S46).

In accordance with the aforementioned embodiments of the invention, the following effects are achievable.

(1) The use of the logical cache memory 10 allows the omission of access to TLB in the event of the cache hit, thus making it feasible to decrease power consumption by approximately 20%.

(2) The physical page information PA (CACHE) corresponding to the logical page information VA (CACHE) as a cache tag address is retained in the cache memory 10 and when the shared area is accessed in the event of the cache miss, the physical page information PA (CACHE) retained in the cache memory is compared with the physical page information PA (TLB) resulting from the translation of the search address by means of the TLB 11. Since the cache entry is processed as the cache hit on condition that the result of the comparison is proved to be conformity, the problem of a synonym in a case where the same physical address is assigned to different logical addresses can be solved in such a manner that the number of times access is provided to the TLB 11 is halved as compared with the conventional arrangement.

(3) In the event of the cache write hit with respect to the cache memory 10, the physical page information PA (CACHE) in the cache entry relating to the hit is used to generate a physical address for external write access, whereby no access to the TLB 11 is needed at all in the event of the cache write hit.

(4) Since it is only necessary, from (2), (3), to provide access to the TLB 11 substantially in the event of the cache miss, the total amount of power consumption due to access to TLB becomes reducible.

(5) Since it is only necessary, from (2), (3), to provide access to the TLB 11 substantially in the event of the cache miss, good access time margins are given when the TLB 11 is accessed. In the case of the physical address for use in determining a set by using part of the logical address that is not translated in TBL, a physical address has to be obtained before an address comparison is made in the cache. When the cache memory is accessed in one machine cycle, the TLB access time comes up to a 0.5 machine cycle. As TLB is accessed only at the time of the cache miss in this embodiment, a decrease in the performance of a microcomputer becomes reducible to the extent that such a decrease can be disregarded even though the TLB access time is set to one machine cycle. Therefore, TLB timing design is facilitated and moreover TLB is allowed to simply deal with the operation of such a microcomputer at a higher speed.

A detailed description has been given of the preferred embodiments of the present invention, which is needless to say not limited to the embodiments thereof but may be modified in various manners without departing from the spirit and scope of the invention.

Although a description has been given of a case where TLB is arranged with an associative memory in the set-associative form in the above embodiments of the invention, what is in the full-associative form may be employed not exclusively, for example. When the full-associative form is employed, however, not only the area occupied by a chip but also its power consumption tends to increase because a memory circuit which by nature needs comparators, bit output by bit output, is used for CAM (Content Addressable Memory). Consequently, it is advantageous to use TLB in the set-associative form within the limits of the possible in consideration of the low power consumption of the microcomputer as a whole.

When the address translation mechanism supports variable page size, the technique of gaining access to the address translation buffer such as TLB employing the set-associative form has to be set variable in accordance with the page size. In that case, a plurality of TLBs in the set-associative form corresponding to page size that can be selected are prepared and any proper one may be used in conformity with the page size involved. Or one TLB in the set-associative form corresponding to a representative page size and another TLB in the full-associative form are otherwise prepared, so that the former is used when the representative page size is involved and the latter is used in any other case.

Further, restricting access to TLB to a case where a gutter space between logical pages occurs will contribute to lower power consumption. In other words, the physical page information obtained from TLB once is properly stored in a register as physical page information is constant within the range of the same logical page and a physical address may be generated by using the physical address information in the register when access is provided within the same logical page.

A description has been given of the application of the present invention made by the present inventors to microcomputers in the field of utilization as a background. However, the present invention is not limited to such applications but is widely applicable to any other data processor. The present invention is applicable to least data processing which makes it a condition to use at least a logical cache memory and an address translation buffer.

Effects achievable by the preferred embodiments of the invention disclosed in the present application may briefly be summarized as follows:

Information such as the physical page information corresponding to the logical page information is retained in the logical cache memory and when the shared area is accessed in the event of the cache miss, the physical page information retained in the cache memory is compared with the physical page information resulting from the translation of the search address by means of the TLB. Since the cache entry is processed as the cache hit on condition that the result of the comparison is proved to be conformity, the problem of a synonym in a case where the same physical address is assigned to different logical addresses can be solved in such a manner that the number of times access is provided to the TLB is halved as compared with the conventional arrangement.

In the event of the cache write hit with respect to the cache memory, the physical page information in the cache entry relating to the hit is used to generate a physical address for external write access, whereby no access to the TLB is needed at all in the event of the cache write hit.

The use of the logical cache memory allows the omission of access to TLB in the event of the cache hit, thus making it feasible to decrease power consumption. Since it is only necessary to provide access to the TLB substantially in the event of the cache miss, moreover, the total amount of power consumption due to access to TLB becomes reducible.

As set forth above, since it is only necessary to provide access to the TLB substantially in the event of the cache miss, good access time margins are given when the TLB is accessed. As TLB is accessed only at the time of the cache miss, a decrease in the performance of a microcomputer becomes reducible to the extent that such a decrease can be disregarded even though the TLB access time is set to one machine cycle. Therefore, TLB timing design is facilitated even in a case where the operating speed of a data processor such as a microcomputer is increased and moreover TLB having no extra high speed memory is also allowed to simply deal with such a high-speed operation.

Further, one TLB in the set-associative form corresponding to a representative page size and another TLB in the full-associative form are otherwise prepared, so that the former is used when the representative page size is involved and the latter is used in any other case. While securing the aforementioned effects, the address translation mechanism is allowed to simply deal with variable page size which it supports.

What is claimed is:

1. A data processor comprising:
    a logical cache memory containing a plurality of cache entries, each containing logical address information as search information;
    a translation lookaside buffer for storing a translation pair for translating a logical address into a physical address, and a control unit controlling the logical cache memory and the translation lookaside buffer;
        wherein each cache entry of the logical cache memory also contains physical address information corresponding to the logical address information in that cache entry;
        wherein when the cache entry selected by the search information from the logical cache memory does not correspond to a desired logical address, the control unit compares each of the physical address information contained in the logical cache memory with physical address information resulting from the translation of the search information by the translation lookaside buffer, wherein a cache-hit results if there is a coincidence between the compared physical address information.

2. A data processor as claimed in claim 1, wherein the desired logical address shares a physical address space with one or more other logical addresses.

3. A data processor comprising:
    a logical cache memory containing logical address information as search information,
    a translation lookaside buffer for storing a translation pair for translating a logical address into a physical address, and a control unit controlling the logical cache memory and the translation lookaside buffer,
    the logical cache memory also containing physical address information corresponding to the logical address information in a cache entry, wherein
        the physical address contained in the cache entry thus selected is utilized for the generation of a physical address for write processing when the cache entry selected by the search information corresponds to a desired logical address, wherein
        when a cache entry selected by the search information from the logical cache memory does not correspond to the desired logical address, each of the physical address information contained in the logical cache memory is compared with physical address information resulting from the translation of the search information by the translation lookaside buffer, wherein a cache-hit results if there is a coincidence between the compared physical address information.

4. A data processor comprising:
    a logical cache memory containing a plurality of entries, each entry containing a logical address information as search information;
    a translation lookaside buffer for storing a translation pair for translating a logical address into a physical address, and a control unit controlling the logical cache memory and the translation lookaside buffer;
    wherein each entry of the logical cache memory also contains a physical address information corresponding to the logical address information in that cache entry;
    wherein the control unit includes:
        a cache address comparator for detecting that the cache entry selected by the search information from the logical cache memory does not correspond to a desired logical address,
        a physical address comparator for comparing each of the physical address information contained in the logical cache memory with physical address information resulting from the translation of the search information by the translation lookaside buffer to detect coincidence therebetween based on the detection made by the cache address comparator,
        a data controller for utilizing the information contained in the cache entry detected as a cache-hit when the comparison made by the physical address comparator results in coincidence, and
        an address controller for utilizing the physical address contained in the cache entry detected as a cache-hit for the generation of a physical address for write processing when the cache entry selected by the search information from the logical cache memory corresponds to the desired logical address.

5. A data processor as claimed in claim 4, wherein the logical cache memory is in a set-associative form and wherein the cache entry also contains an address space identifier of a multiple logical address space, a share flag for indicating whether the logical address space specified by the address space identifier shares a physical address space with one or more other logical address spaces, logical page information, data corresponding to the logical address and physical page information as the information assigned to the physical address.

6. A data processor as claimed in claim 5, wherein the translation lookaside buffer is in the set-associative form and wherein its translation pair also contains an address space identifier of a multiple logical address space, a share flag for indicating whether the logical address space specified by the address space identifier shares a physical address space with one or more other logical address spaces, logical page information, data corresponding to the logical address and physical page information as the information assigned to the physical address.

7. A data processor as claimed in claim 6, wherein a second translation lookaside buffer in a full-associative form is used as another translation lookaside buffer in place of the translation lookaside buffer when a size of the logical page is altered.

8. A data processor as claimed in claim 4,
wherein the desired logical address shares a physical address space with one or more other logical addresses.

9. A data processor formed on a semiconductor substrate comprising:
a logical cache memory containing logical address information as search information;
a translation lookaside buffer for storing a translation pair for translating a logical address into a physical address, and a control unit controlling the logical cache memory and the translation lookaside buffer;
the logical cache memory also containing physical address information corresponding to the logical address information in a cache entry; wherein
the physical address contained in the cache entry thus selected is utilized for the generation of a physical address for write processing when the cache entry selected by the search information corresponds to a desired logical address, wherein
when a cache entry selected by the search information from the logical cache memory does not correspond to the desired logical address, each of the physical address information contained in the logical cache memory is compared with physical address information resulting from the translation of the search information by the translation lookaside buffer, wherein a cache-hit results if there is a coincidence between the compared physical address information.

10. A data processor as claimed in claim 9, wherein the logical cache memory is in a set-associative form and wherein the cache entry also contains an address space identifier of a multiple logical address space, a share flag for indicating whether the logical address space specified by the address space identifier shares a physical address space with one or more other logical address spaces, logical page information, data corresponding to the logical address and physics page information as the information assigned to the physical address.

11. A data processor as claimed in claim 10, wherein the translation lookaside buffer is in the set-associative form and wherein its translation pair also contains an address space identifier of a multiple logical address space, a share flag for indicating whether the logical address space specified by the address space identifier shares a physical address space with one or more other logical address spaces, logical page information, data corresponding to the logical address and physical page information as the information assigned to the physical address.

12. A data processor as claimed in claim 11, wherein a second translation lookaside buffer in a full-associative form is used as another translation lookaside buffer in place of the translation lookaside buffer when a size of the logical page is altered.

13. A data processor as claimed in claim 9, wherein the data processor further comprises a controller coupled to a bus external to the data processor, wherein the bus is coupled to main memory external to the data processor.

* * * * *